Patented Oct. 9, 1934

1,975,841

UNITED STATES PATENT OFFICE 1,975,841

PACKING TIN PLATES

Harold Septimus Gifford, Brooklands, England, assignor to Dunlop Rubber Company, Limited, a British company No Drawing. Application September 8, 1932, Serial No. 632,195. In Great Britain November 10, 1931

3 Claims. (Cl. 91—68)

This invention relates to improvements in the method for packing tin plates particularly for export.

In shipping tin plates difficulties arise in ensuring that they will arrive abroad free from corrosion.

The object of the present invention is so to treat tin plates, particularly for export, as to ensure their arrival abroad without being affected by corrosion.

According to the present invention the method of packing tin plates particularly for export comprises treating each tin plate individually, or preferably in bundles, with aqueous dispersions of the kinds hereinafter specified.

The tin plates can be treated with the aforesaid aqueous dispersions by any one or more of the known operations such as dipping, spreading or spraying.

Bundles of tin plates may for example comprise about 112 sheets bound tightly together. These bundles when dipped into the aforesaid aqueous dispersions and the dispersions allow to dry thereon have been found to resist deterioration by corrosion during storage and transport.

By tin plates is to be understood plates made of metal covered with tin, as for example, tinned iron plates.

The dispersions of rubber or the like comprise those consisting of or containing rubber, guttapercha, balata or similar vegetable resins occurring naturally or artificially obtained and in vulcanized or unvulcanized condition. Such artificial aqueous dispersions may include those of coagulated rubber, synthetic rubber, vulcanized rubber, waste or reclaim.

If desired, any of the aforementioned dispersions may be used alone or in admixture with one another.

Any of the aforesaid dispersions may contain usual known compounding ingredients and/or may be in concentrated form.

Concentrates such as are obtained in U. S. Patent 1,846,164 February 23, 1932 in which may be incorporated any one or more of the usual compounding ingredients may also be used.

Compositions as described and claimed in Patent 1,904,576 comprising rubber or similar vegetable resins in the form of aqueous emulsions or dispersions thereof in admixture with an aqueous dispersion of wax or mixture of waxes wherein the wax content of the aforesaid compositions lies between the order of 20% and 95% on the dry rubber-wax content have been found suitable for use.

If desired the tin plates can be treated with any one or more of the aforesaid aqueous dispersions of rubber or the like and this treatment followed by a subsequent treatment for example with a wax or mixture of waxes employed either in molten condition or as a solution, emulsion or suspension.

Having now particularly described and ascertained the nature of my said invention and in what manner the same is to be performed, I declare that—

What I claim is:

1. A tightly bound bundle of tin plates hermetically enclosed in a deposit of dispersed materials comprising rubber.

2. A tightly bound bundle of tin plates hermetically enclosed in a deposit of dispersed materials comprising rubber and wax.

3. A tightly bound bundle of tin plates hermetically enclosed in a deposit comprising unmasticated rubber.

HAROLD SEPTIMUS GIFFORD.